(12) United States Patent
Elwell et al.

(10) Patent No.: US 9,266,473 B1
(45) Date of Patent: Feb. 23, 2016

(54) REMOTE HANDS-FREE BACKSEAT DRIVER

(75) Inventors: Joseph Elwell, San Diego, CA (US);
Alan F. Buhler, Escondido, CA (US);
Aliza Duenas Carpio, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 687 days.

(21) Appl. No.: 13/345,450

(22) Filed: Jan. 6, 2012

(51) Int. Cl.
*H04N 7/18* (2006.01)
*B60R 1/00* (2006.01)

(52) U.S. Cl.
CPC ........................................ *B60R 1/00* (2013.01)

(58) Field of Classification Search
CPC .................. G08G 1/096716; G08G 1/096758; G08G 1/096783; G08G 1/0965; G08G 1/16
USPC ........................................................ 348/148
See application file for complete search history.

(56) References Cited

U.S. PATENT DOCUMENTS

| 2006/0215589 A1* | 9/2006 | Taborisskiy et al. .......... 370/310 |
| 2009/0079555 A1* | 3/2009 | Aguirre De Carcer et al. ............................. 340/441 |

* cited by examiner

*Primary Examiner* — William C Vaughn, Jr.
*Assistant Examiner* — Daniel Tekle
(74) *Attorney, Agent, or Firm* — Osha Liang LLP

(57) ABSTRACT

A method to communicate driving status from a vehicle. The method includes obtaining, using a mobile device travelling in the vehicle, movement data of the vehicle, determining, using a computer processor of the mobile device, that the vehicle is in motion by analyzing the movement data based on a specified criterion, generating, in response to determining that the vehicle is in motion, driving status data of the vehicle by further analyzing the movement data based on the specified criterion, and transmitting, using the mobile device, the driving status data to a remote user away from the vehicle.

21 Claims, 6 Drawing Sheets

REMOTE HANDS-FREE BACKSEAT DRIVER

BACKGROUND

Driving while talking on the phone, even with a hands-free device, is generally not considered safe. When a driver holds a conversation with a passenger in the car, that passenger generally reacts to the surroundings the same way the driver does. He/she will warn the driver of upcoming hazards and will be quiet during emergency situations. In addition, the passenger may see blind spots that the driver may not notice. On the other hand, when holding a conversation with someone on a hands-free mobile phone, the caller often ignores the driver's surroundings and continues to talk during driving emergencies. Even worse, the caller may reprimand the driver for not talking when the driver is trying to navigate a dangerous maneuver requiring concentration.

SUMMARY

In general, in one aspect, the invention relates to a method to communicate driving status from a vehicle. The method includes obtaining, using a mobile device travelling in the vehicle, movement data of the vehicle, determining, using a computer processor of the mobile device, that the vehicle is in motion by analyzing the movement data based on a specified criterion, generating, in response to determining that the vehicle is in motion, driving status data of the vehicle by further analyzing the movement data based on the specified criterion, and transmitting, using the mobile device, the driving status data to a remote user away from the vehicle.

In general, in one aspect, the invention relates to a method to communicate driving status from a vehicle. The method includes receiving, from a mobile device travelling in the vehicle, driving status data of the vehicle, and presenting, using a telecommunication device of a remote user away from the vehicle, the driving status data to the remote user who is engaged in a phone call using the telecommunication device with a user of the mobile device, wherein the mobile device is held in a holder in the vehicle for obtaining movement data of the vehicle by view a roadway, and wherein the driving status data is generated by analyzing, using a computer processor of the mobile device and in response to a signal from the holder, the movement data based on a specified criterion to determine that the vehicle is in motion.

In general, in one aspect, the invention relates to a mobile device to communicate driving status from a vehicle. The mobile device includes a processor, a motion detector executing on the processor and configured to obtain movement data representing movement of the vehicle when the mobile device is travelling in the vehicle, a driving status analyzer executing on the processor and configured to determine that the vehicle is in motion by analyzing the movement data based on a specified criterion, and generate, in response to determining that the vehicle is in motion, driving status data of the vehicle by further analyzing the movement data based on the specified criterion, and a transmitter configured to transmit the driving status data to a remote user away from the vehicle.

In general, in one aspect, the invention relates to a telecommunication device to communicate driving status from a vehicle. The telecommunication device includes a processor and memory storing instructions when executed by the processor comprising functionality to establish a phone call connection with a mobile device in the vehicle, receive, from the mobile device travelling in the vehicle, driving status data of the vehicle, and present the driving status data to a remote user away from the vehicle and engaged in a phone call using the telecommunication device with a user of the mobile device, wherein the mobile device is held in a holder in the vehicle for obtaining movement data of the vehicle, and wherein the driving status data is generated by analyzing, using a computer processor of the mobile device and in response to a signal from the holder, the movement data based on a specified criterion to determine that the vehicle is in motion.

In general, in one aspect, the invention relates to a non-transitory computer readable medium storing instructions to communicate driving status from a vehicle. The instructions when executed by a computer processor of a mobile device include functionality to obtain, using the mobile device travelling in the vehicle, movement data of the vehicle, determine that the vehicle is in motion by analyzing the movement data based on a specified criterion, generate, in response to determining that the vehicle is in motion, driving status data of the vehicle by further analyzing the movement data based on the specified criterion, and transmit, using the mobile device, the driving status data to a remote user away from the vehicle.

Other aspects of the invention will be apparent from the following detailed description and the appended claims.

DETAILED DESCRIPTION

Figure 1:
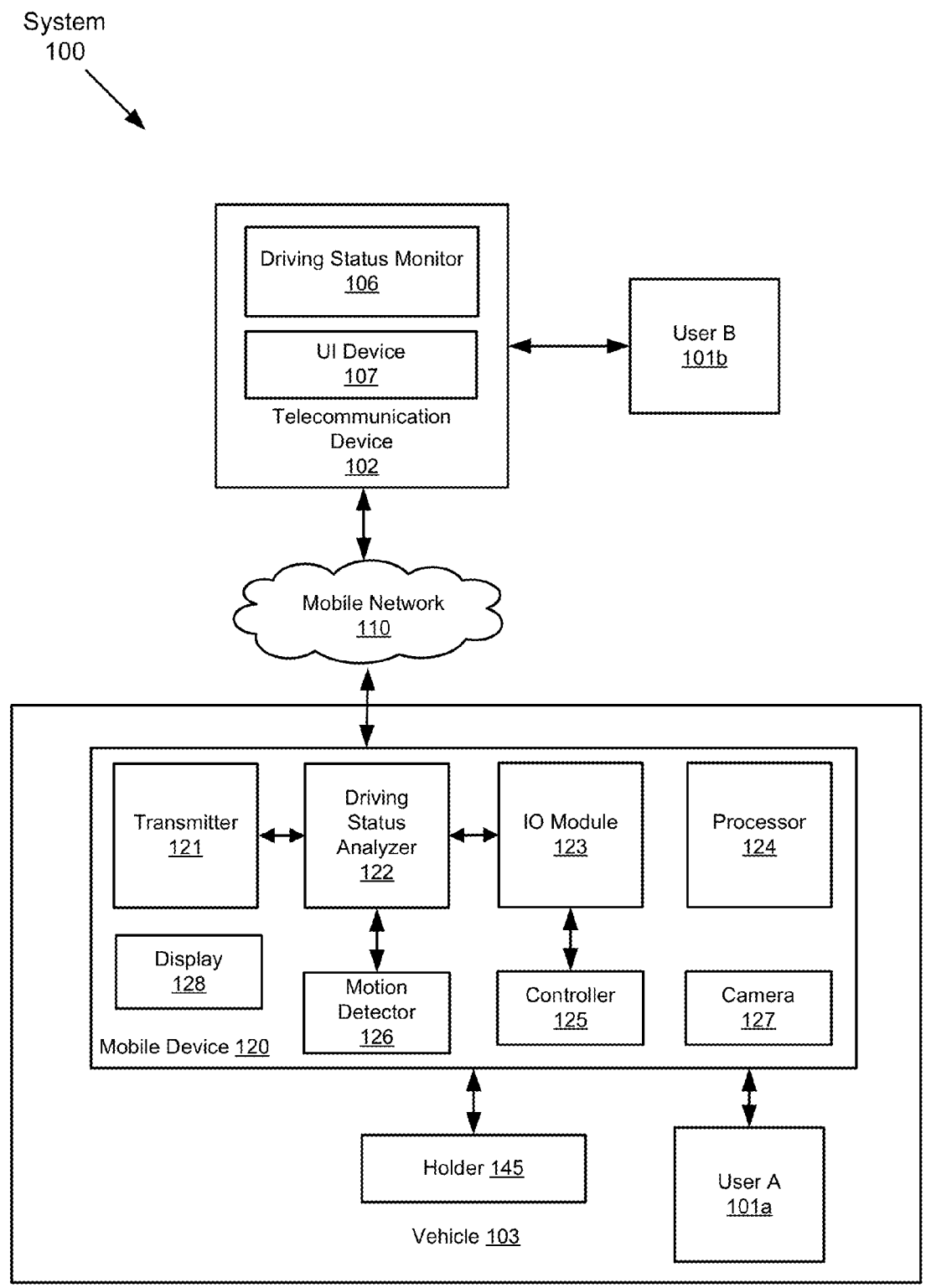
FIG. 1 shows a schematic diagram of a system of remote hands-free backseat driver in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a method for a mobile phone in a moving vehicle to transmit driving status of a driver to a third party engaged in a phone conversation with the driver. The vehicle driving status may include speed, acceleration, gyroscopic information, etc. in various formats such as text, graphics, audio, or video format.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a social survey system in accordance with embodiments disclosed herein.

As shown in FIG. 1, the system (100) includes a mobile device (120) of user A (101a) in a vehicle (103) and a telecommunication device (102) of user B (101b) (also referred to as a remote user) away from the vehicle (103) where the mobile device (120) and the telecommunication device (102) are coupled via mobile network (110). For example, the mobile network (110) may include a cellular phone network, wired and/or wireless portions of the Internet, and/or other data communications networks such as wide area networks (WANs), local area networks (LANs), etc. The mobile device (120) may be a cellular phone, a smartphone, a tablet computer, a notebook computer, or any other mobile device having computing and telecommunication capabilities. For example, the mobile device (120) may belong to the user A (101a) or borrowed by the user A (101a) from another passenger in the vehicle (103). Optionally, the mobile device (120) is placed in a holder (145) in a vehicle (103). The mobile device (120) includes a processor (124) configured to execute a driving status analyzer (122), an input/output (IO) module (123), and a transmitter (121). Further, the mobile device (120) includes a motion detector (126), a camera (127), a display (128), and a controller (125). The telecommunication device (102) may be a land line telephone, a mobile phone, a tablet computer, a notebook computer a desktop computer, or any other computing device having telecommunication capabilities. In addition, the telecommunication device (102) includes a driving status monitor (106) and a user interface (UI) device (107). In one or more embodiments, the user A (101a) and the user B (101b) are engaged in a phone call using the mobile device (120) and the telecommunication device (102) via the mobile network (110). In one or more embodiments, the user A (101a) may be a driver or a passenger of the vehicle (103). While the description below focuses on the scenario where the user A (101a) and the mobile device (120) are inside the vehicle (103) to illustrate communication of the driving status, those skilled in the art will recognize that the user A (101a) and the mobile device (120) may leave the vehicle (103) when the vehicle (103) arrives at a destination.

In one or more embodiments of the invention, driving status of the vehicle (103) having the user A (101a) inside is transmitted to the user B (101b) who is away from the vehicle (103) and has engaged in a telephone conversation with the user A (101a) via a telephone connection established over the mobile network (110) using the telecommunication device (102) and the mobile device (120). Throughout this disclosure, the term "driving status" refers to characteristics of the vehicle movement and information related to the surroundings of the vehicle, including upcoming hazards, emergency situations, blind spots, etc. In one or more embodiments, the driving status is derived from information obtained using the motion detector (126) and the camera (127) or information provided by the vehicle (103). Specifically, the driving status may be represented by driving event and alert described below. In one or more embodiments, the driving status is presented to the user A (101a) using the mobile device (120) and presented to the user B (101b) using the telecommunication device (102).

In one or more embodiments, the mobile device (120) is placed in the vehicle (103) without any physical or communicative coupling with the vehicle (103). For example, the mobile device (120) may be placed within a shirt pocket of the user A (101a) or on a dashboard of the vehicle (103). In such embodiments, the driving status is limited to motion related information without meaningful image or video components.

In one or more embodiments, the mobile device (120) is placed in the holder (145) installed in the vehicle (103). For example, the holder (145) may be a fixture providing mechanical stability and relevant viewing angle of the vehicle surroundings to the mobile device (120). The holder (145) may be installed on the windshield, dashboard, or any other convenient location in the vehicle (103) such that the camera (127) of the mobile device (120) is directed toward the roadway for optionally capturing images of the vehicle surroundings and the display (128) of the mobile device (120) is directed toward the user A (101a) for optionally displaying diving status and/or other relevant information to the user A (101a). In addition, the holder (145) may include a wired or wireless signal interface allowing the mobile device (120) and the vehicle (103) to exchange information.

In one or more embodiments, the mobile device (120) includes the motion detector (126) that is configured to obtain movement data representing movement of the vehicle (103) when the mobile device (120) is in the vehicle (103). In one or more embodiments, the motion detector (126) includes a hardware sensor for sensing speed, acceleration, and/or other motion related parameters experienced by the mobile device (120). These parameters represent movement of the vehicle (103) because the mobile device (120) is moving along with the vehicle (103). In such embodiments, the motion detector (126) also includes software instructions to retrieve and format these parameters from the hardware sensor under the control of the processor (124). In one or more embodiments, the motion detector (126) includes only a software component to retrieve vehicle movement data directly from the vehicle (103) via the aforementioned signal interface provisioned in the holder (145).

In one or more embodiments, the mobile device (120) includes the driving status analyzer (122) executing on the processor (124) and configured to determine that the user A (101a) is driving the vehicle (103) by analyzing the movement data based on a specified criterion. For example, the driving status analyzer (122) makes such determination if the speed and/or acceleration contained in the movement data exceed a specified limit (e.g., 10 miles/hour, 0 to 30 miles/hour in 5 seconds). In one or more embodiments, the driving status analyzer (122) is activated by an input from the user A (101a), such as a user interface command received via the IO module (123). Accordingly, the driving status analyzer (122) may be turned on or off by the user A (101a). In one or more embodiments, the driving status analyzer (122) is activated by a signal from the holder (145), such as a vehicle-in-motion signal provided by the vehicle (103) via the aforementioned signal interface. Accordingly, the driving status analyzer (122) is automatically activated once it is placed in the holder (145) when the vehicle (145) is moving.

In response to determining that the user A (101a) is driving the vehicle, the driving status analyzer (122) generates driving status data of the vehicle (103) by further analyzing the movement data. For example, the raw data obtained via the motion detector (126) may be formatted. In addition, relevant parameters may be extracted from the raw data using a specified formula. In one or more embodiments, the raw data includes speed and acceleration along the direction of travel as well as lateral speed and acceleration. Based on such raw data, the driving status data may include a measure (e.g., slow, normal, fast, excessive, abrupt, forward, backing, etc.) of speed and/or acceleration along the travel direction as well as a measure (e.g., slow, normal, fast, excessive, emergency, abrupt, left, right, etc.) of lateral speed and/or acceleration associated with turning or other emergency maneuver. In another example, the driving status data may include photo images and/or video stream of traffic surrounding the vehicle (103) that is captured using the camera (127) of the mobile device (120) or captured using a camera (e.g., a rear view backing up camera) installed on the vehicle (103) and provided via the aforementioned signal interface of the holder (145).

In one or more embodiments, a driving event is identified by the driving status analyzer (122) from the driving status data. For example, the driving event may include a turning event, a braking event, a changing lane event, a vehicle passing event, a freeway entering event, a freeway exiting event, a stopped-in-traffic event, a negotiating-curve event, a U-turn event, a parking-in-progress event, a parked event, or any other event relating to an upcoming hazard, surrounding change, emergency, etc. In one or more embodiments, the driving event is determined by analyzing the motion related driving status data, the image/video stream component of the driving status data, or a combination thereof. For example, detail analysis of linear speed/acceleration and lateral speed/acceleration over a time window may indicate whether the vehicle is turning, braking, changing lane, passing another vehicle, entering a freeway, exiting a freeway, stopped in traffic, negotiating a curve, making a U-turn, parking in process, or parked. In addition, such analysis may be supplemented with image analysis of the image sequence or video stream captured from the camera (127). In another example, image analysis of the image sequence or video stream captured from the camera (127) may independently indicate all or a portion of the aforementioned driving events.

In response to detecting the driving event, an alert may be generated based on the driving event by the driving status analyzer (122). In one or more embodiments, any driving event is considered as an alert. In one or more embodiments, the driving event is classified in multiple categories, such as slow, normal, abrupt, excessive, dangerous, etc. In such embodiments, driving status may be filtered into alerts based on these categories. For example, the alert is generated for each driving event classified as abrupt, excessive, or dangerous category.

In one or more embodiments, the mobile device (120) includes the display (128) configured to display one or more of the aforementioned driving status, driving event, and alert. In one or more embodiments, the display (128) may be any suitable display device, such as a LCD flat panel, LED panel, plasma panel display, or similar devices.

In one or more embodiments, the mobile device (120) includes the transmitter (121) executing on the processor (124) and is configured to transmit the driving status data and/or the alert via the phone call connection over the mobile network (110) to the telecommunication device (120). In one or more embodiments, the driving status data and/or the alert are transmitted as a text message or a multimedia message, e.g., using a SMS (Short Message Service) or MMS (Multimedia Messaging Service) protocols via the phone call connection over the mobile network (110) to the telecommunication device (120). In one or more embodiments, the driving status data and/or the alert are transmitted via the phone call connection to the telecommunication device (120). For example, the transmitter (121) may encode the driving status and/or the alert into the VoIP data stream that is transmitted as a phone call conversation session by the mobile device (120) to the mobile network (110). In one or more embodiments, the driving status and/or alert is inserted in the speech data of the telephone conversation and transmitted periodically. For example, the turning event, braking event, etc. are transmitted as they occur. In one or more embodiments, the driving status and/or alert is transmitted continuously and concurrently with the speech data in the telephone conversation. For example, the image sequence and/or video stream may be transmitted continuously.

In one or more embodiments, transmission of the driving status data and/or the alert start subsequent to starting the phone call between the user A (101a) and the user B (101b) using the mobile device (102) and the telecommunication device (120). In one or more embodiments, transmission of the driving status data and/or the alert end upon termination of the phone call between the user A (101a) and the user B (101b) using the mobile device (102) and the telecommunication device (120). In one or more embodiments, transmission of the driving status data and/or the alert may be activated and/or deactivated based on an input from the user A (101a) and/or the user B (101b) that are received using the mobile device (102) and/or the telecommunication device (120).

In one or more embodiments, the mobile device (120) includes the IO module (123) that is configured to receive user input to activate one or more of the driving status analyzer (122), the transmitter (121), etc. For example, the activation may be based on an input from the user A (101a) via a command of the mobile device (120) or based on an input from the user B (101b) via a command embedded in the speech data of the telephone conversation, or based on a combination of the inputs from both user A (101a) and user B (101b). In one or more embodiment, an additional command is provided to control the viewing angle of the camera (127). For example, this command, either received from the user B (101b) via the phone call connection or received from the user A (101a) as a voice activated command, may be decoded as a control signal by the IO module (123) and in turn sent to the holder (145) to reposition the mobile device (120). Specifically, the holder (145) is adapted with one or more pivoted supports (e.g., gimbals) that are controlled by the control signal to orient the mobile device (127) along a desired viewing angle. Accordingly, the viewing angle of the camera (127) may be adjusted in response to the user A (101a) or the user B (101b) viewing the captured traffic image/video on the mobile device (120) and the telecommunication device (102), respectively. More details of using the mobile device (120) to transmit driving status data are described in the text associated with the example shown in FIGS. 3A-3C found below, which are not exhaustive and should not be used to limit the invention.

In one or more embodiments of the invention, the telecommunication device (102) is configured to establish a telephone connection over the mobile network (110) when the user A (101a) calls the user B (101b), or vice versa. In one or more embodiments, the telecommunication device (102) includes the driving status monitor (106) that is configured to receive, via the phone call connection, driving status data of the vehicle (103) and to decode the received driving status data for presenting to the user (101b) using the UI device (107). In one or more embodiments, the driving status data includes a driving event and/or alert described above and may be presented to the user B (101b) in various formats such as text, graphics, audio, video, tactile, etc. For example, the UI device (107) may include a display, a speaker, a vibrator, etc. allowing the user B (101b) to view, hear, feel, or otherwise perceive the driving event and/or alert. More details of using the telecommunication device (102) to receive driving status data are described in the text associated with the example shown in FIGS. 3A-3C, which are not exhaustive and should not be used to limit the invention.

Figure 2:
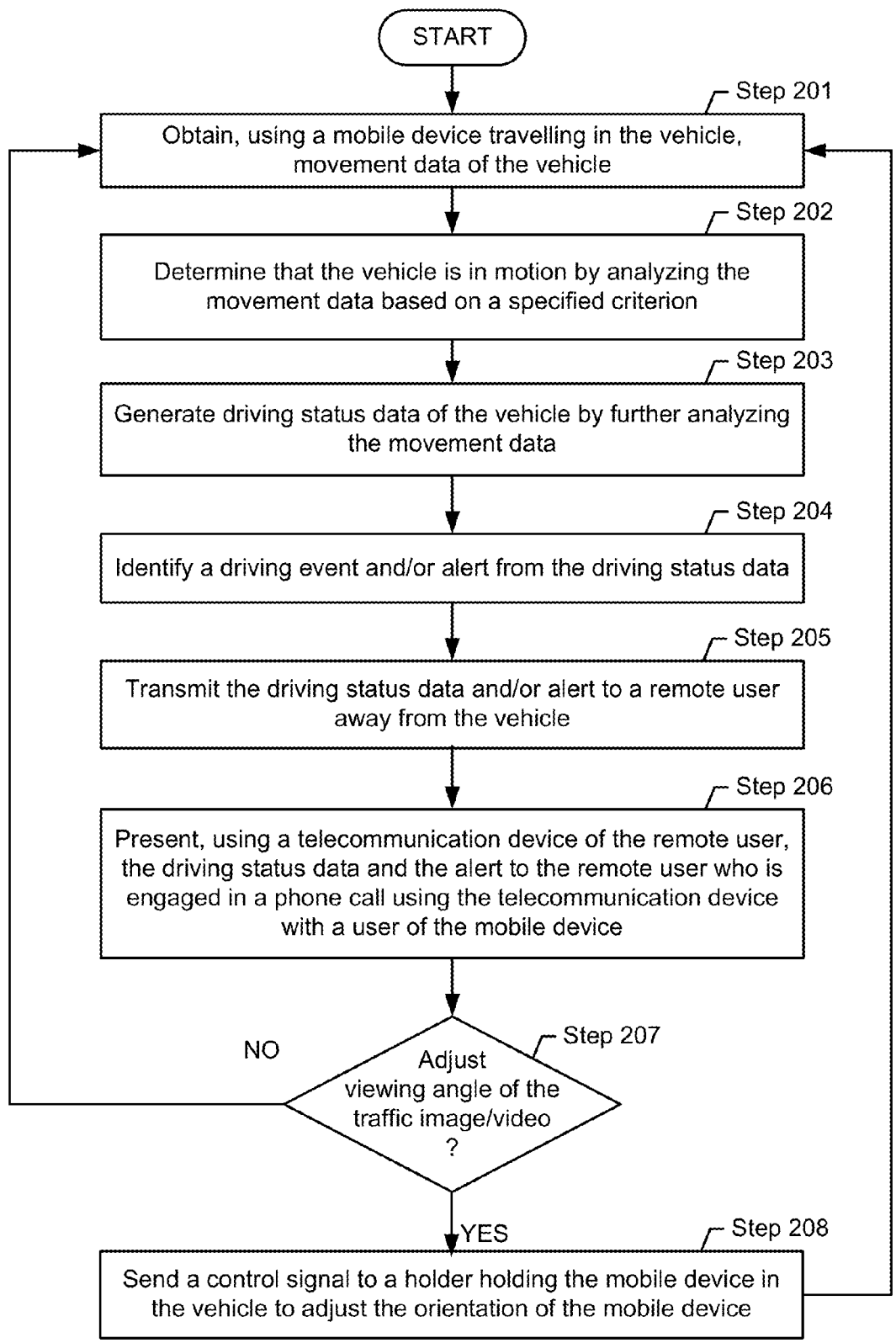
FIG. 2 shows a flowchart of a method of remote hands-free backseat driver in accordance in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

Consistent with the description of FIG. 1, the method shown in FIG. 2 allows a third party (away from a moving vehicle and referred to as a remote user) engaged in a telephone conversation with a driver of the moving vehicle to receive driving status information from a mobile device used by the driver for the telephone conversation. In particular, the method shown in FIG. 2 is activated, automatically or via a user command to start executing from Step 201, when the telephone connection is established using the mobile device of the driver. Once activated, the method shown in FIG. 2 can be terminated, automatically or via a user command at any step or after proceeding to a specified step to stop execution, when the telephone connection is terminated. As noted above, the mobile device may be a smartphone, a tablet computer, a notebook computer, etc. of the driver. In contrast, the remote user may be stationery and uses a telecommunication device (e.g., a land telephone, computer, etc.) for the telephone connection or may also be moving and the telecommunication device may also be a mobile device (e.g., a mobile phone, tablet computer, etc.).

Initially in Step 201, movement data of the vehicle is obtained using the mobile device in accordance with one or more embodiments of the invention. In one or more embodiments when the mobile device is inside the vehicle, the movement data is obtained using a hardware sensor of the mobile device, such as an accelerometer. In one or more embodiments, the movement data is provided by the vehicle and obtained via a signal interface established between the mobile device and the vehicle. For example, the signal interface may be a wireless interface such as a Bluetooth® (a registered trademark of Bluetooth SIG. Inc., Delaware Wash.), interface. In another example, the signal interface may be a wired interface provisioned through a holder installed in the vehicle to hold the mobile device.

In Step 202, the vehicle is determined to be in motion by analyzing the movement data in accordance with one or more embodiments of the invention. In particular, the fact that the mobile device receives speed and acceleration data from an embedded sensor or from the vehicle via the signal interface indicates that the vehicle is moving. When the received speed and acceleration data exceeds a specified limit (e.g., faster than a typical walking or running speed), it is determined that the vehicle is being driven. In one or more embodiments, such determination is qualified by an input of the user to make distinction between the scenarios of user driving the vehicle or merely being a passenger of the vehicle. In certain scenarios, the user may decide to allow the mobile device to transmit the driving condition of the vehicle even though the user is merely a passenger instead of the driver of the vehicle.

In Step 203, driving status data of the vehicle is generated by further analyzing the movement data in accordance with one or more embodiments of the invention. For example, the raw speed/acceleration data obtained via the embedded sensor or provided by the vehicle may be formatted. In addition, relevant parameters may be extracted from the raw data using a specified formula. In one or more embodiments, the raw data includes speed and acceleration along the direction of travel as well as lateral speed and acceleration. Based on such raw data, the driving status data may include a measure (e.g., slow, normal, fast, excessive, abrupt, forward, backing, etc.) of speed and/or acceleration along the travel direction as well as a measure (e.g., slow, normal, fast, excessive, emergency, abrupt, left, right, etc.) of lateral speed and/or acceleration associated with turning or other emergency maneuver. In another example, the driving status data may include photo images and/or video stream of traffic surrounding the vehicle that is captured using a camera of the mobile device or captured using a camera (e.g., a rear view backing up camera) installed on the vehicle and provided via the aforementioned signal interface.

In Step 204, a driving event is identified from the driving status data in accordance with one or more embodiments of the invention. For example, the driving event may includes a turning event, a braking event, a changing lane event, a vehicle passing event, a freeway entering event, a freeway exiting event, a stopped-in-traffic event, a negotiating-curve event, a U-turn event, a parking-in-progress event, a parked event, or any other event relating to an upcoming hazard, surrounding change, emergency, etc. In one or more embodiments, the driving event is determined by analyzing the motion related driving status data, the image/video stream component of the driving status data, or a combination thereof. For example, detail analysis of linear speed/acceleration and lateral speed/acceleration over a time window may indicate whether the vehicle is turning, braking, changing lane, passing another vehicle, entering a freeway, exiting a freeway, stopped in traffic, negotiating a curve, making a U-turn, parking in process, or parked. In addition, such analysis may be supplemented with image analysis of the image sequence or video stream captured from the camera of the mobile device. In another example, image analysis of the image sequence or video stream captured from the camera may independently indicate all or a portion of the aforementioned driving events.

In response to detecting the driving event, an alert may be generated based on the driving event. In one or more embodiments, any driving event is considered as an alert. In one or more embodiments, the driving event is classified in multiple categories, such as slow, normal, abrupt, excessive, dangerous, etc. In such embodiments, driving status may be filtered into alerts based on these categories. For example, the alert is generated for each driving event classified as abrupt, excessive, or dangerous category.

In Step 205, the driving status data and/or alert is transmitted to the remote user in accordance with one or more embodiments of the invention. In one or more embodiments, the driving status and/or the alert are transmitted by the mobile device of the driver to the telecommunication device of the remote user as a text message or a multimedia message, such as based on the SMS (Short Message Service), MMS (Multimedia Messaging Service), or other suitable protocols. In one or more embodiments, the driving status and/or the alert are encoded into the VoIP data stream that is transmitted as a phone call conversation session by the mobile device of the driver to the telecommunication device of the remote user. In one or more embodiments, the driving status and/or alert is inserted in the speech data of the telephone conversation and transmitted periodically. For example, the turning event, braking event, etc. are transmitted as they occur. In one or more embodiments, the driving status and/or alert is transmitted continuously and concurrently with the speech data in the telephone conversation. For example, the image sequence and/or video stream may be transmitted continuously.

In one or more embodiments, transmission of the driving status data and/or the alert start subsequent to starting the phone call between the user using the mobile device and the remote user using the telecommunication device. In one or more embodiments, transmission of the driving status data and/or the alert end upon termination of the phone call between the user of the mobile device and the remote user using the telecommunication device. In one or more embodiments, transmission of the driving status data and/or the alert may be activated and/or deactivated based on an input from the user using the mobile device and/or the remote user using the telecommunication device.

In Step 206, the driving status data and/or the driving event/alert is presented to the remote user in various formats such as text, graphics, audio, video, tactile, etc. in accordance with one or more embodiments of the invention. For example, the driving status data and/or the driving event/alert may be presented using a display, a speaker, a vibrator, etc. of the telecommunication device allowing the remote user to view, hear, feel, or otherwise perceive the driving event and/or alert. More details of presenting the driving status data are described in the example shown in FIGS. 3A-3C below.

In Step 207, a determination is made as to whether the viewing angle of the traffic image/video is to be adjusted in accordance with one or more embodiments of the invention. In one or more embodiments, such adjustment is automatically performed periodically (e.g., every 5 second, minute, etc.). In one or more embodiments, such adjustment is performed based on a voice activated command from the driver or from a remote command of the remote user that is embedded in and decoded from the telephone conversation speech data. If the viewing angle is not to be adjusted, the method returns to Step 201 to continue the monitoring/transmission activities. If the viewing angle is to be adjusted, the method proceeds to Step 208 where a control signal is sent to a holder holding the mobile device in the vehicle for re-orienting the mobile device along a new viewing angle specified in the voice activated command or the remote commend. With the viewing angle adjusted, the method returns to Step 201 to continue the monitoring/transmission activities in accordance with one or more embodiments of the invention.

FIGS. 3A-3D show an application example in accordance with one or more embodiments of the invention. This example application may be practiced using the system (100) of FIG. 1 and based on the method described with respect to FIG. 2 above.

The example depicted in FIGS. 3A-3D is based on a scenario of a driver Joseph calling another person, Mary, while driving. Mary answers the phone to establish a phone connection. Joseph's mobile phone detects that Joseph is driving and offers to enable the safer hands free dialing option. Once accepted by Joseph, the mobile phone sends Mary's device video/audio feed as well as other data points. Mary's device displays a video of what Joseph sees from his vehicle. As an example, if suddenly there is a lot of traffic ahead, Mary would see the traffic while talking to Joseph. Mary would warn Joseph of the traffic that Joseph might not have noticed yet. Joseph would slow down the car, Mary's device would react by giving a tactile or an audible alarm telling Mary that Joseph is slowing the vehicle rapidly. Joseph and Mary would then continue the conversation safely.

In another example, Joseph and Mary are talking on the phone while Joseph is driving. Mary is badgering Joseph about his plans for the evening and Joseph is flipping flopping about what he wants to do. Suddenly a truck veers onto the highway into Joseph's traffic lane. Mary sees this and immediately goes silent (rather than continuing to badger Joseph about whether Joseph is coming home for dinner Mary's silence helps Joseph concentrate on the road so that Joseph can steer the vehicle around the truck. Joseph is safe and makes it home to have dinner with Mary.

Figure 3A:
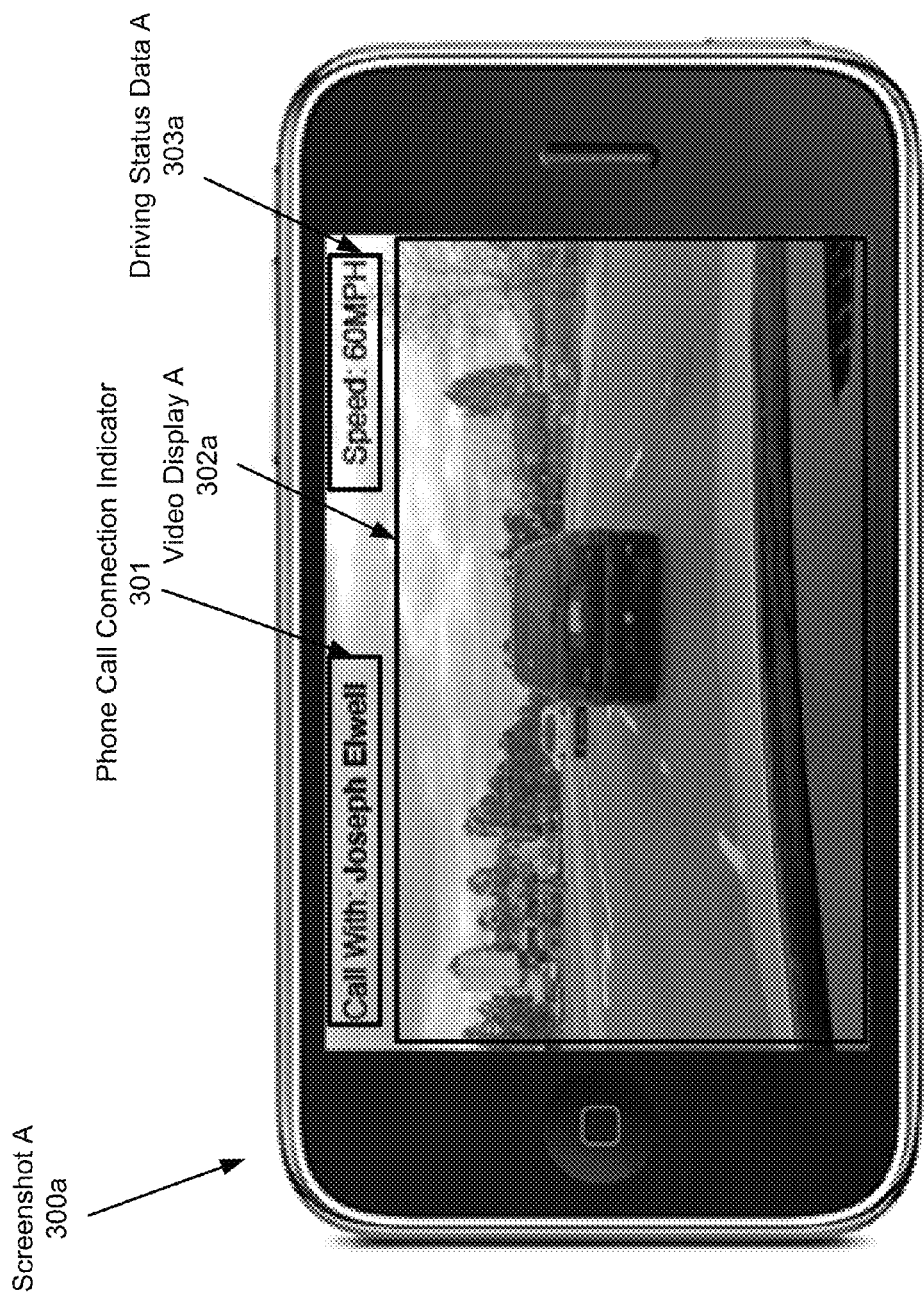
FIGS. 3A-3C show an example of remote hands-free backseat driver in accordance in accordance with one or more embodiments of the invention.

FIG. 3A shows a screenshot A (300a) of Mary's phone during the phone conversation described above. Optionally, similar information may be displayed on Joseph's mobile phone as well. For example, Joseph's mobile phone has a camera on the opposite side of the display and is put in a holder on the dashboard of his vehicle with the camera facing the vehicle traveling direction and the display facing Joseph. As shown, the screenshot A (300a) includes a video display A (302a) captured by the camera showing the traffic surrounding Joseph's vehicle. In addition, the video display A (302a) is overlaid with the phone call connection indicator (301) indicating the Mary is talking to Joseph as well as a data field showing the driving status data A (303a) indicating that Joseph is traveling at 60 miles per hour. As described above, Joseph or Mary may adjust the viewing angle of the video display A (302a) using a voice activated command or a remote command to rotate the holder and pointing the camera at a new direction.

Figure 3B:
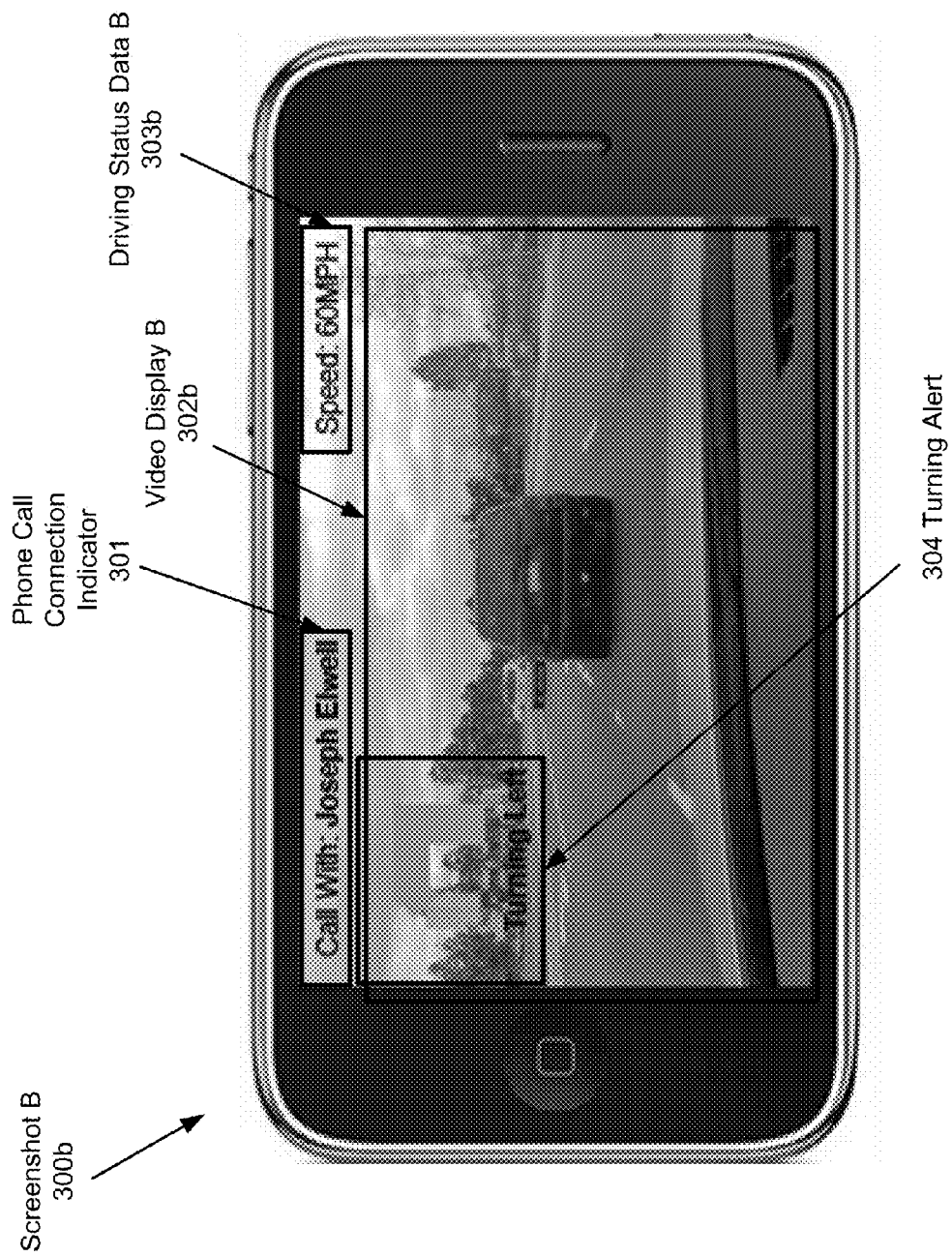

FIG. 3B shows a screenshot B (300b) of Mary's phone during the phone conversation when Joseph is making a left turn. Optionally, similar information may be displayed on Joseph's mobile phone as well. As shown, the video display B (302b) continues to show traffic surrounding the vehicle in the same way as the video display A (302a) and is overlaid with the same phone call connection indicator (301) and the data field showing driving status data B (303b) indicating that Joseph is still traveling at 60 miles per hour. In addition, the video display B (302b) is further overlaid with the turning alert (304) showing that Joseph is making a left turn.

Figure 3C:
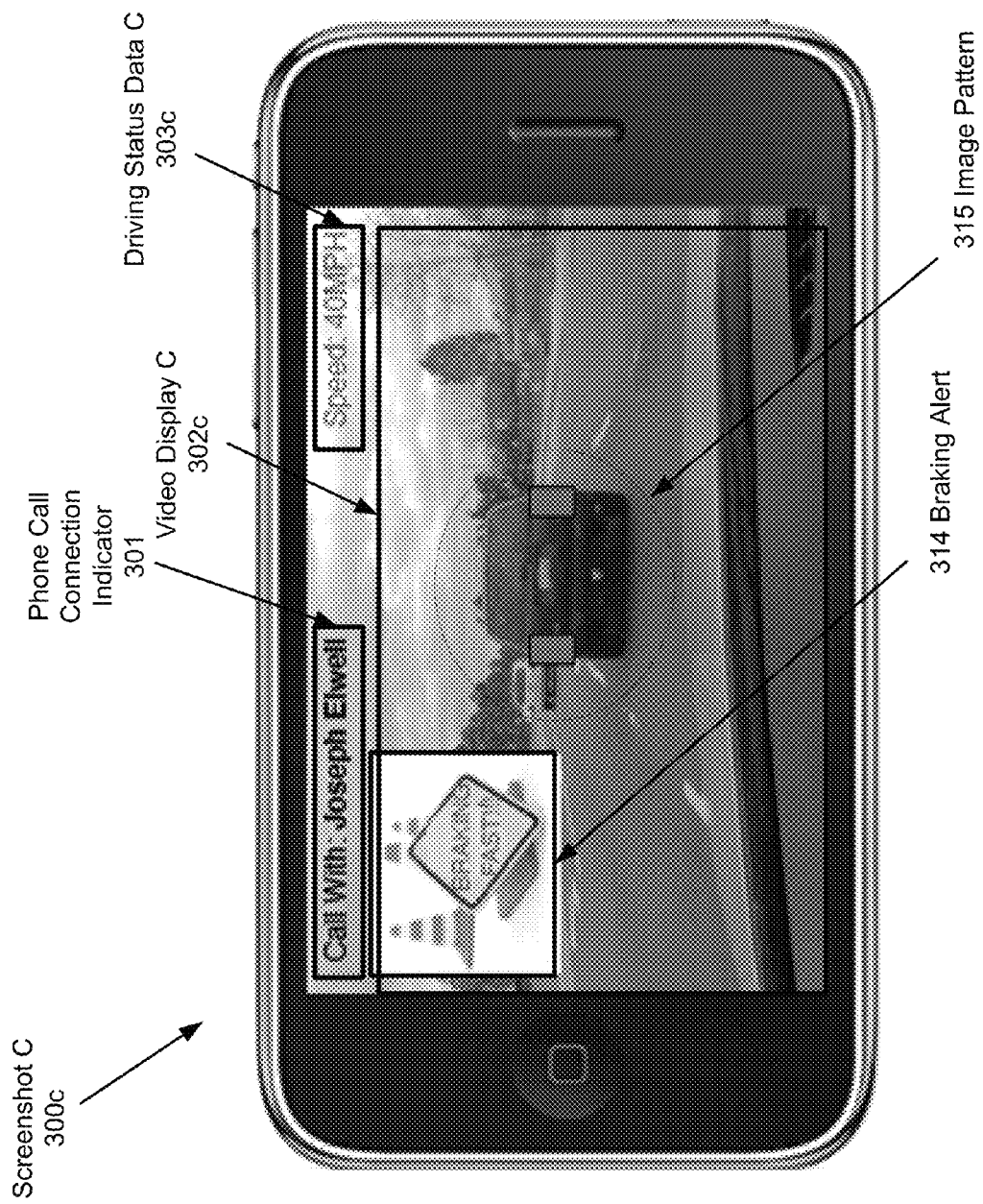

FIG. 3C shows a screenshot C (300c) of Mary's phone during the phone conversation when Joseph is making a left turn. Optionally, similar information may be displayed on Joseph's mobile phone as well. As shown, the video display C (302c) continues to show traffic surrounding the vehicle in the same way as the video display B (302b) and is overlaid with the same phone call connection indicator (301) and the data field showing driving status data C (303c) indicating that Joseph has slowed down to 40 miles per hour. In addition, the video display C (302c) is further overlaid with the braking alert (314) showing that Joseph is braking fast. For example, the braking alert (314) is generated based on analyzing the vehicle speed data and analyzing the video frames to detect the image pattern (315) of the braking light of another vehicle immediate in front of Joseph. As noted above, a separate alert (not shown) may be generated based on the detected front vehicle braking light independent of the slowing speed of Joseph's vehicle.

Figure 4:
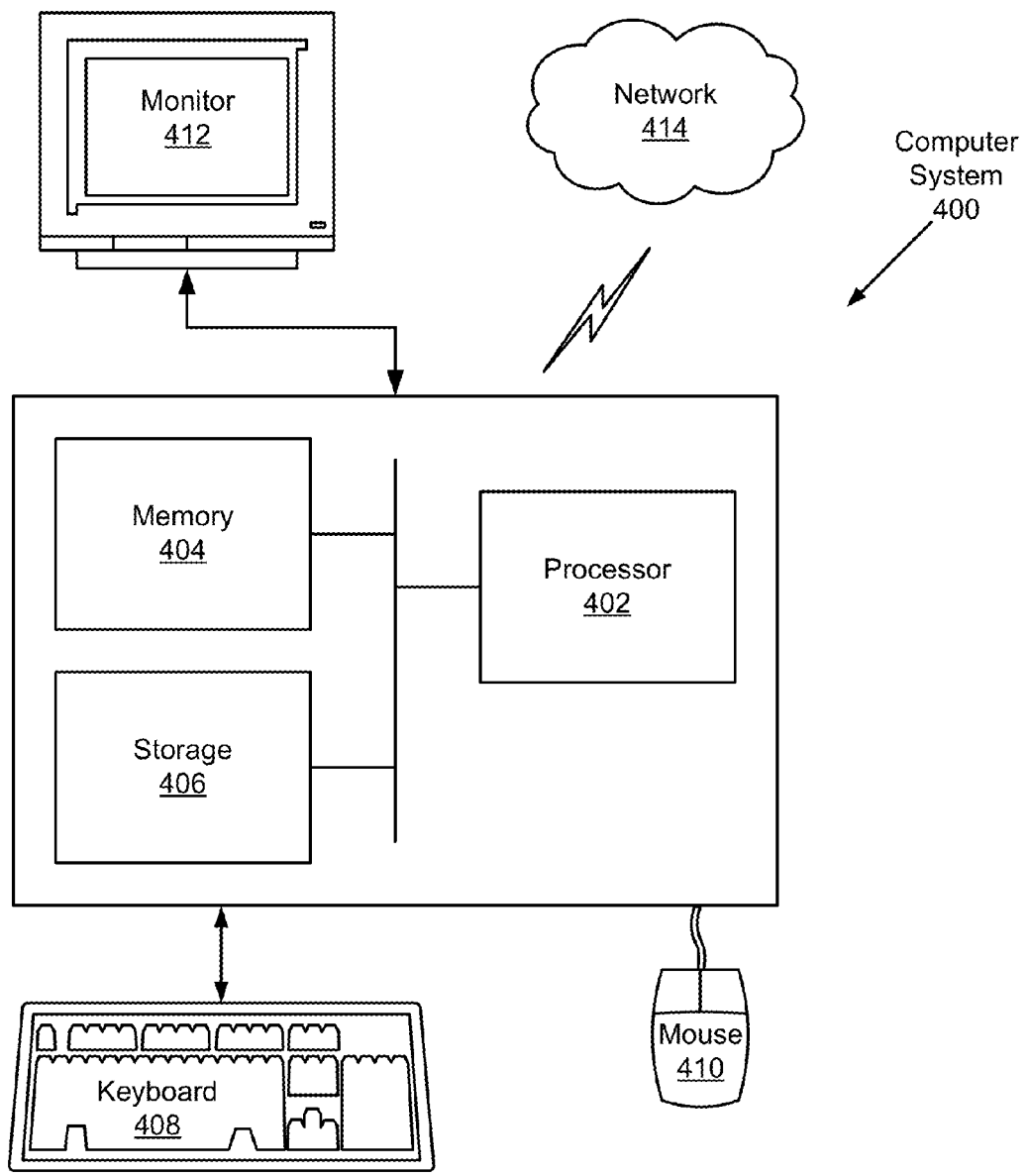
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to communicate driving status from a vehicle, comprising:
    obtaining, using a mobile device travelling in the vehicle, movement data of the vehicle;
    detecting that a phone call connection for a telephone conversation is established between a driver using the mobile device and a remote user away from the vehicle;
    determining, using a computer processor of the mobile device and in response to detecting the phone call connection for the telephone conversation being established, that the vehicle is in motion by analyzing the movement data based on a specified criterion;
    generating, in response to detecting the phone call connection for the telephone conversation being established and determining that the vehicle is in motion, driving status data of the vehicle by further analyzing the movement data based on the specified criterion;
    transmitting, using the mobile device and in response to detecting the phone call connection for the telephone conversation being established, the driving status data to the remote user, and
    stopping, in response to detecting the phone call connection for the telephone conversation being terminated, transmission of the driving status data to the remote user.

2. The method of claim 1, further comprising:
    identifying a driving event from the driving status data; and
    further transmitting, using the mobile device and in response to detecting the driving event, an alert based on the driving event to the remote user,
    wherein the specified criterion comprises at least one selected from a group consisting of a first criterion based on a velocity of the vehicle and a second criterion based on an acceleration of the vehicle.

3. The method of claim 2, further comprising:
    presenting, using a telecommunication device of the remote user, the driving status data and the alert to the remote user who is engaged in the telephone conversation using the telecommunication device with the driver using the mobile device.

4. The method of claim 1,
    wherein the mobile device is held in a holder in the vehicle,
    wherein the holder is located within the vehicle to allow the mobile device to view a roadway,
    wherein the movement data is obtained from at least one selected from a group consisting of a sensor of the mobile device and a sensor of the vehicle, and
    wherein determining that the user is driving the vehicle is in response to a signal from the holder.

5. The method of claim 4, further comprising:
    sending, using the mobile device and in response to a command received from the remote user, a control signal to the holder to reposition the mobile device in the holder,
    wherein the driving status data comprises video data representing any moving vehicle in proximity to the vehicle, and
    wherein the mobile device is repositioned to adjust a viewing angle of the video data for the remote user.

6. A method to communicate driving status from a vehicle, comprising:
    detecting that a phone call connection for a telephone conversation is established between a mobile device used by a driver who is travelling in the vehicle and a telecommunication device used by a remote user who is away from the vehicle;
    receiving, from the mobile device travelling in the vehicle and in response to detecting the phone call connection for the telephone conversation being established, driving status data of the vehicle; and
    presenting, using the telecommunication device of the remote user away from the vehicle, the driving status data to the remote user, and
    stopping, in response to detecting the phone call connection for the telephone conversation being terminated, presentation of the driving status data to the remote user,
    wherein the mobile device is held in a holder in the vehicle for obtaining movement data of the vehicle by viewing a roadway, and
    wherein the driving status data is generated by analyzing, using a computer processor of the mobile device and in response to a signal from the holder, the movement data based on a specified criterion to determine that the vehicle is in motion.

7. The method of claim 6, further comprising:
    sending, to the mobile device from the remote user, a command to reposition the mobile device in the holder,
    wherein the mobile device sends, in response to the command, a control signal to the holder to reposition the mobile device,
    wherein the driving status data comprises video data representing any moving vehicle in proximity to the vehicle, and
    wherein the mobile device is repositioned to adjust a viewing angle of the video data for the remote user.

8. The method of claim 6, further comprising:
    receiving, from the mobile device, an alert based on a driving event, wherein the driving event is identified by the mobile device from the driving status data, wherein the specified criterion comprises at least one selected from a group consisting of a first criterion based on a velocity of the vehicle and a second criterion based on an acceleration of the vehicle; and generating, in response to receiving the alert, a vibration of the telecommunication device, wherein a magnitude of the vibration represents at least one selected from a group consisting of the velocity of the vehicle and the acceleration of the vehicle.

9. A mobile device to communicate driving status from a vehicle, comprising:
- a processor;
- a motion detector executing on the processor and configured to obtain movement data representing movement of the vehicle when the mobile device is travelling in the vehicle;
- a driving status analyzer executing on the processor and configured to:
  - detect that a phone call connection for a telephone conversation is established between a driver using the mobile device and a remote user away from the vehicle;
  - determine, in response to detecting the phone call connection for the telephone conversation being established, that the vehicle is in motion by analyzing the movement data based on a specified criterion; and
  - generate, in response to detecting the phone call connection for the telephone conversation being established and determining that the vehicle is in motion, driving status data of the vehicle by further analyzing the movement data based on the specified criterion; and
- a transmitter configured to:
  - transmit, in response to detecting the phone call connection for the telephone conversation being established, the driving status data to the remote user; and
  - stop, in response to detecting the phone call connection for the telephone conversation being terminated, transmission of the driving status data to the remote user.

10. The mobile device of claim 9, the driving status analyzer further configured to:
- identify a driving event from the driving status data; and
- further transmit, in response to detecting the driving event, an alert based on the driving event to the remote user,
- wherein the specified criterion comprises at least one selected from a group consisting of a first criterion based on a velocity of the vehicle and a second criterion based on an acceleration of the vehicle.

11. The mobile device of claim 10,
- wherein the driving status data and the alert is presented to the remote user using a telecommunication device of the remote user, and
- wherein the remote user is engaged in the telephone conversation using the telecommunication device with the driver using the mobile device.

12. The mobile device of claim 9,
- wherein the mobile device is held in a holder in the vehicle,
- wherein the holder is located within the vehicle to allow the mobile device to view a roadway,
- wherein the movement data is obtained from at least one selected from a group consisting of a sensor of the mobile device and a sensor of the vehicle, and
- wherein determining that the user is driving the vehicle is in response to a signal from the holder.

13. The mobile device of claim 12, further comprising a controller configured to:
- send, in response to a command received from the remote user, a control signal to the holder to reposition the mobile device in the holder,
- wherein the driving status data comprises video data representing any moving vehicle in proximity to the vehicle, and
- wherein the mobile device is repositioned to adjust a viewing angle of the video data for the remote user.

14. A telecommunication device to communicate driving status from a vehicle, comprising:
- a processor; and
- memory storing instructions when executed by the processor comprising functionality to:
  - establish a phone call connection with a mobile device used by a driver who is travelling in the vehicle;
  - receive, from the mobile device travelling in the vehicle, driving status data of the vehicle; and
  - present, in response to establishing the phone call connection for a telephone conversation between the driver using the mobile device and a remote user using the telecommunication device and away from the vehicle, the driving status data to the remote user, and
  - stop, in response to the phone call connection for the telephone conversation being terminated, presentation of the driving status data to the remote user,
- wherein the mobile device is held in a holder in the vehicle for obtaining movement data of the vehicle, and
- wherein the driving status data is generated by analyzing, using a computer processor of the mobile device and in response to detecting the phone call connection for the telephone conversation being established, the movement data based on a specified criterion to determine that the vehicle is in motion.

15. The telecommunication device of claim 14, the instructions when executed by the processor further comprising functionality to:
- send, to the mobile device from the remote user, a command to reposition the mobile device in the holder,
- wherein the mobile device sends, in response to the command, a control signal to the holder to reposition the mobile device,
- wherein the driving status data comprises video data representing any moving vehicle in proximity to the vehicle, and
- wherein the mobile device is repositioned to adjust a viewing angle of the video data for the remote user.

16. The telecommunication device of claim 14, the instructions when executed by the processor further comprising functionality to:
- receive, from the mobile device, an alert based on a driving event, wherein the driving event is identified by the mobile device from the driving status data, wherein the specified criterion comprises at least one selected from a group consisting of a first criterion based on a velocity of the vehicle and a second criterion based on an acceleration of the vehicle; and
- generate, in response to receiving the alert, a vibration of the telecommunication device, wherein a magnitude of the vibration represents at least one selected from a group consisting of the velocity of the vehicle and the acceleration of the vehicle.

17. A non-transitory computer readable medium storing instructions to communicate driving status from a vehicle, the instructions when executed by a computer processor of a mobile device comprising functionality to:
- obtain, using the mobile device travelling in the vehicle, movement data of the vehicle;
- detect that a phone call connection for a telephone conversation is established between a driver using the mobile device and a remote user away from the vehicle;

determine, in response to detecting the phone call connection for the telephone conversation being established, that the vehicle is in motion by analyzing the movement data based on a specified criterion;

generate, in response to detecting the phone call connection for the telephone conversation being established and determining that the vehicle is in motion, driving status data of the vehicle by further analyzing the movement data based on the specified criterion;

transmit, using the mobile device and in response to detecting the phone call connection for the telephone conversation being established, the driving status data to the remote user, and stop, in response to detecting the phone call connection for the telephone conversation being terminated, transmission of the driving status data to the remote user.

18. The non-transitory computer readable medium of claim 17, the instructions when executed by the computer processor further comprising functionality to:

identify a driving event from the driving status data; and further transmit, using the mobile device and in response to detecting the driving event, an alert based on the driving event to the remote user, wherein the specified criterion comprises at least one selected from a group consisting of a first criterion based on a velocity of the vehicle and a second criterion based on an acceleration of the vehicle.

19. The non-transitory computer readable medium of claim 18, wherein the driving status data and the alert are presented, using a telecommunication device of the remote user, to the remote user who is engaged in the telephone conversation using the telecommunication device with the driver using the mobile device.

20. The non-transitory computer readable medium of claim 17, wherein the mobile device is held in a holder in the vehicle, wherein the holder is located within the vehicle to allow the mobile device to view a roadway, wherein the movement data is obtained from at least one selected from a group consisting of a sensor of the mobile device and a sensor of the vehicle, and wherein determining that the user is driving the vehicle is in response to a signal from the holder.

21. The non-transitory computer readable medium of claim 20, the driving status data and the alert send, using the mobile device and in response to a command received from the remote user, a control signal to the holder to reposition the mobile device in the holder, wherein the driving status data comprises video data representing any moving vehicle in proximity to the vehicle, and wherein the mobile device is repositioned to adjust a viewing angle of the video data for the remote user.

* * * * *